United States Patent
Barker et al.

[11] Patent Number: 5,690,019
[45] Date of Patent: Nov. 25, 1997

[54] BREAD BUN MOLD

[76] Inventors: Alonzo Andrew Barker, deceased, late of Menominee, Mich.; Lucille M. Barker, heir, Rennes Health Center East, Peshtigo, Wis. 54157; Barbara Lam, heir, 1209 Amsterdam, Madison, Wis. 53716; Lawrence Barker, heir, N2257 0-1 Dr., Menominee, Mich. 49858; Cecilia Ross, heir, N1281 River Rd., Menominee, Mich. 49858; Phillip Barker, heir, 1121 37th Ave., Menominee, Mich. 49858; Mark Barker, heir, W5896 #6 Rd., Menominee, Mich. 49858; Owen Barker, heir, 1713 23rd Ave., Menominee, Mich. 49858; Roy Barker, heir, 821 16th Ave., Menominee, Mich. 49858; Alice Romsek, heir, 1751 Scott Creek Dr., Belmont, Mich. 49306; Walter Barker, heir, 2409 21st St., Menominee, Mich. 49858; Christine Mueller, heir, N1960 River Dr., Menominee, Mich. 49858; Leo J. Barker, heir, 1210 15th St., Menominee, Mich. 49858

[21] Appl. No.: 354,619
[22] Filed: Dec. 13, 1994
[51] Int. Cl.⁶ .................................................. A47J 37/01
[52] U.S. Cl. ................. 99/428; 99/441; 99/442; 249/DIG. 1; 249/119; 249/122
[58] Field of Search ............................. 99/426, 428, 441, 99/442; 249/119, 120, 122, 123, DIG. 1

[56] References Cited

U.S. PATENT DOCUMENTS

| | | | |
|---|---|---|---|
| 2,222,112 | 11/1940 | Miller | 99/428 |
| 2,601,822 | 7/1952 | Hopkins | 99/442 |
| 2,810,338 | 10/1957 | Dawson | 249/122 |
| 3,158,087 | 11/1964 | Hedglin | 99/428 |
| 3,326,119 | 6/1967 | Smith | 99/428 |
| 3,747,508 | 7/1973 | Elam, Sr. | 99/354 |
| 3,943,840 | 3/1976 | Bolte | 99/428 |
| 4,009,859 | 3/1977 | Bangert | 249/DIG. 1 |
| 4,047,477 | 9/1977 | Berke | 99/428 |
| 4,190,229 | 2/1980 | Bradshaw | 249/124 |
| 4,311,716 | 1/1982 | Launay | 426/275 |
| 4,440,377 | 4/1984 | Hujik | 249/119 |
| 4,656,939 | 4/1987 | Kukura | 99/428 |

*Primary Examiner*—David Scherbel
*Assistant Examiner*—Reginald L. Alexander
*Attorney, Agent, or Firm*—Loyd W. Bonneville

[57] ABSTRACT

A baking utensil so shaped as to mold within bread dough baked upon it one or more buns, each with a recess to retain a weiner, bratwurst, frankfurter, processed meat link, hamburger or other cooked meat product.

6 Claims, 6 Drawing Sheets

BREAD BUN MOLD

CROSS REFERENCES

Invention Disclosure Document filed on May 19, 1991 on the inventor's behalf by American Inventors Corporation, a commercial patenting and marketing firm, entitling the invention, "Hot Dog Baking Pan".

SUMMARY OF THE INVENTION

The present invention is a simple and economical heat resistant sheet (1) or pan configured with folds (2) or corrugations (2) of sufficient height to form within bread dough placed upon it, one or more buns with a recess for the reception of weiners, bratwursts, frankfurters, hamburger patties or other thickened sandwich meat products and accompanying condiments. It may be characterized as belonging to the following field: A food preparation accessary; more particularly, a baking aid for specialty shaped bread.

THE DRAWINGS

FIGS. 1, 2 and 3 represent a baking utensil suitable for three bratwurst buns. The respective views are: FIG. 1—perspective; FIG. 2—top; FIG. 3—side.

FIGS. 4, 5 and 6 represent a baking utensil suitable for three hot dog or weiner buns. The respective views are: FIG. 4—perspective; FIG. 5—top; FIG. 6—side.

FIGS. 7, 8, 9 and 10 represent a baking utensil suitable for either fractional portion of a singular bun. The respective views are: FIG. 7—perspective; FIG. 8—top; FIG. 9—side; and FIG. 10—end.

FIGS. 11, 12 and 13 represent a baking utensil suitable for three closed end bratwurst buns. The respective views are: FIG. 11—perspective; FIG 12—top; FIG 13—side.

FIGS. 14, 15, 16 and 17 represent a baking utensil suitable for either fractional portion of a singular closed end bun. The respective views are: 14—top; FIG. 15—side with exterior partially removed to disclose the interior; FIG. 16—end with similar partial removal; and FIG. 17—perspective.

FIGS. 18, 19, 20 and 21 represent a baking utensil suitable for a bivalved hamburger bun. The respective views are: FIG 18—perspective; FIG. 19—top; FIG. 20—side with exterior partially removed to disclose the interior; and FIG. 21—end.

DETAILED DESCRIPTION OF THE INVENTION

Background

Figure 1:
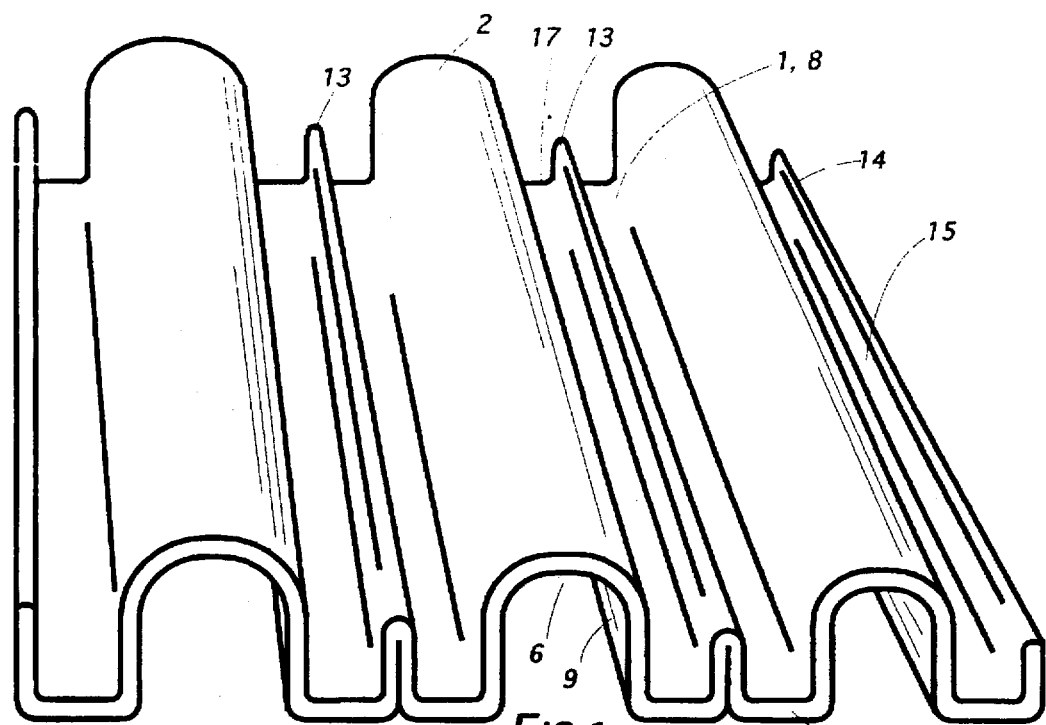
Figure 2:
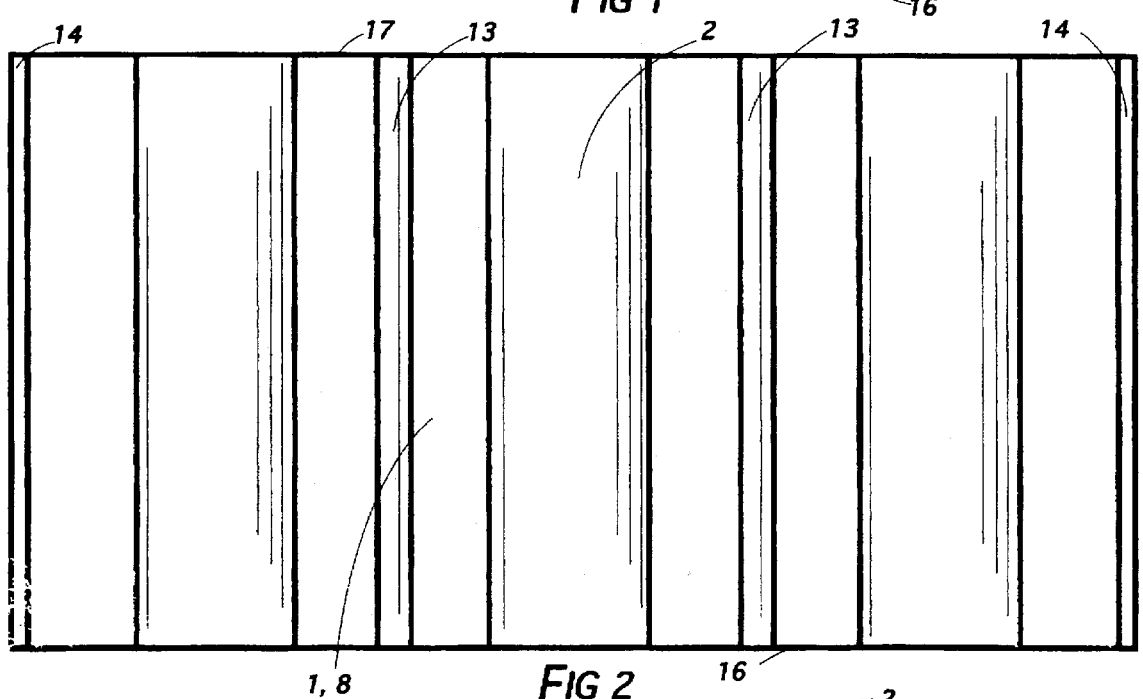
Figure 3:
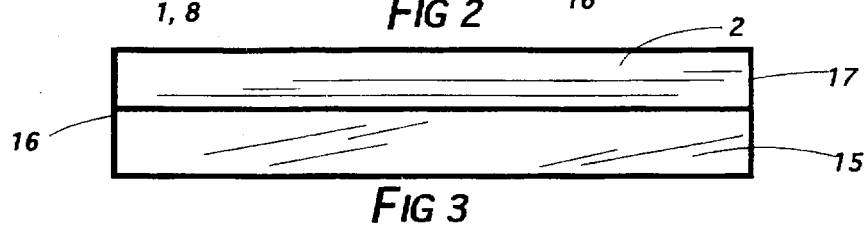
Figure 4:
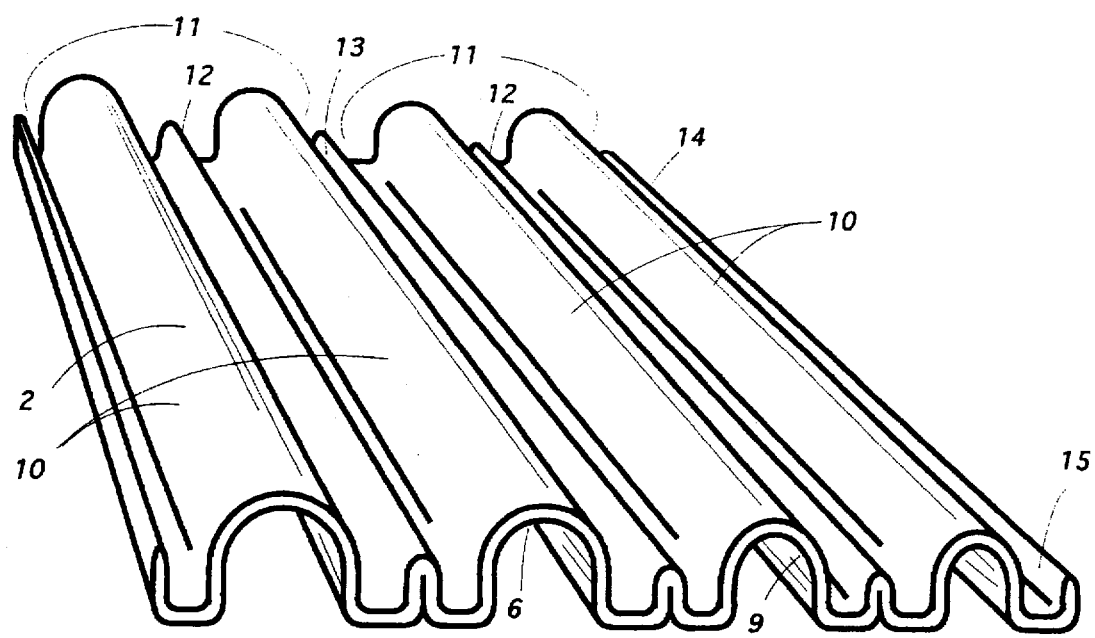
Figure 5:
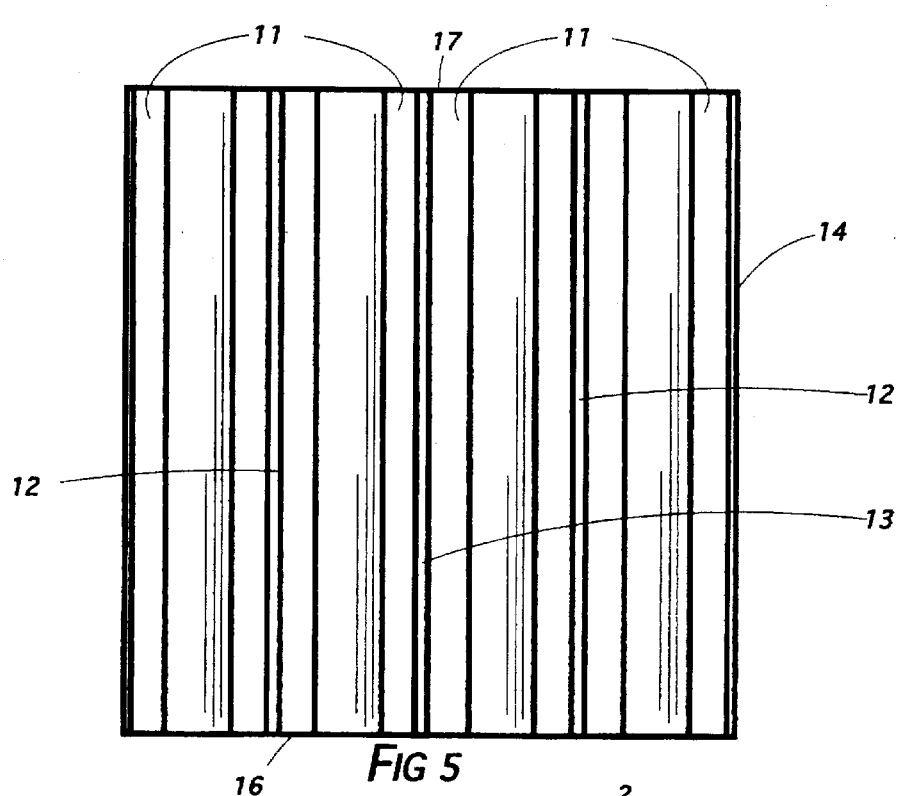
Figure 6:
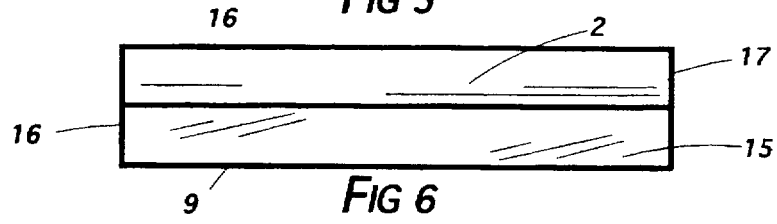
Figure 7:
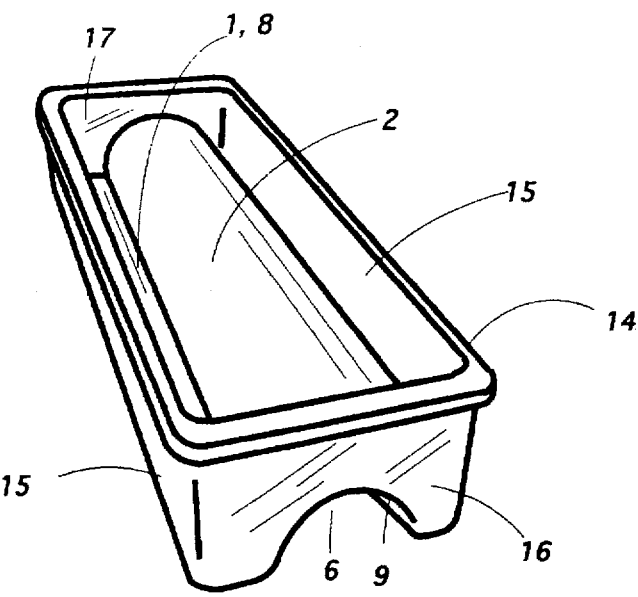
Figure 8:
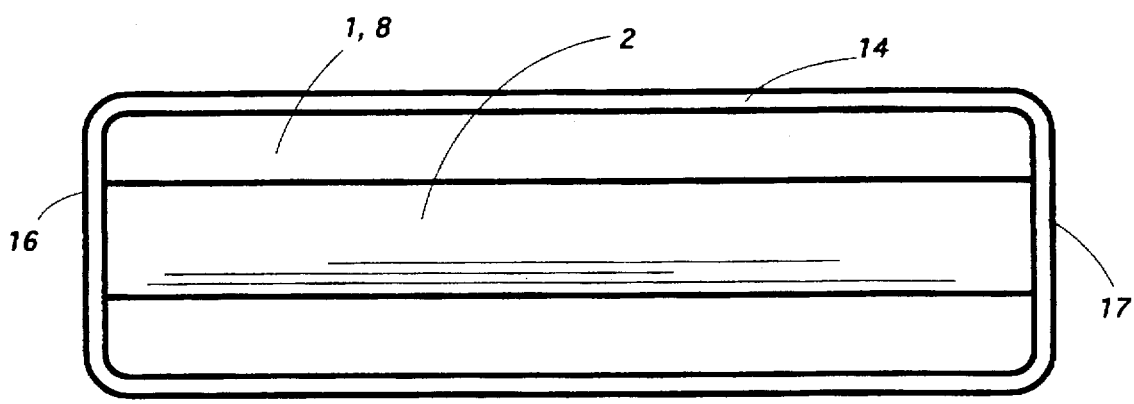
Figure 9:
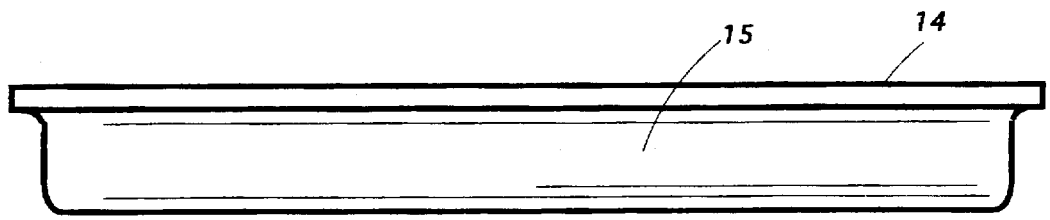
Figure 10:
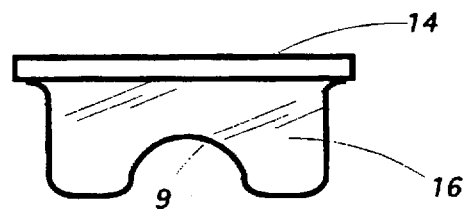
Figure 11:
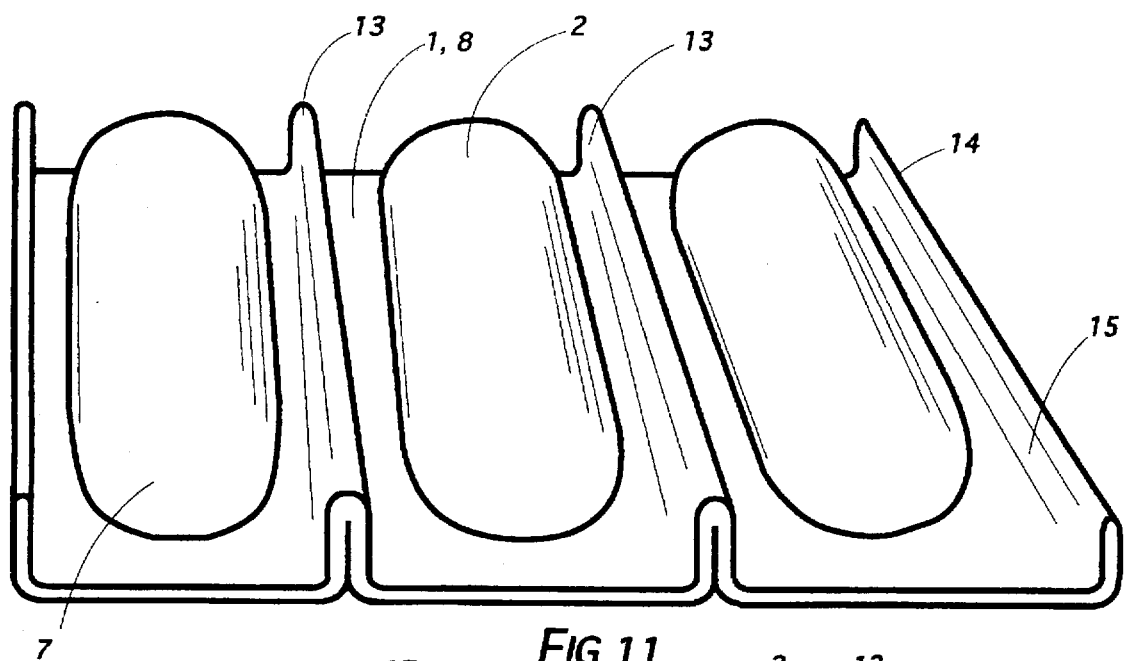
Figure 12:
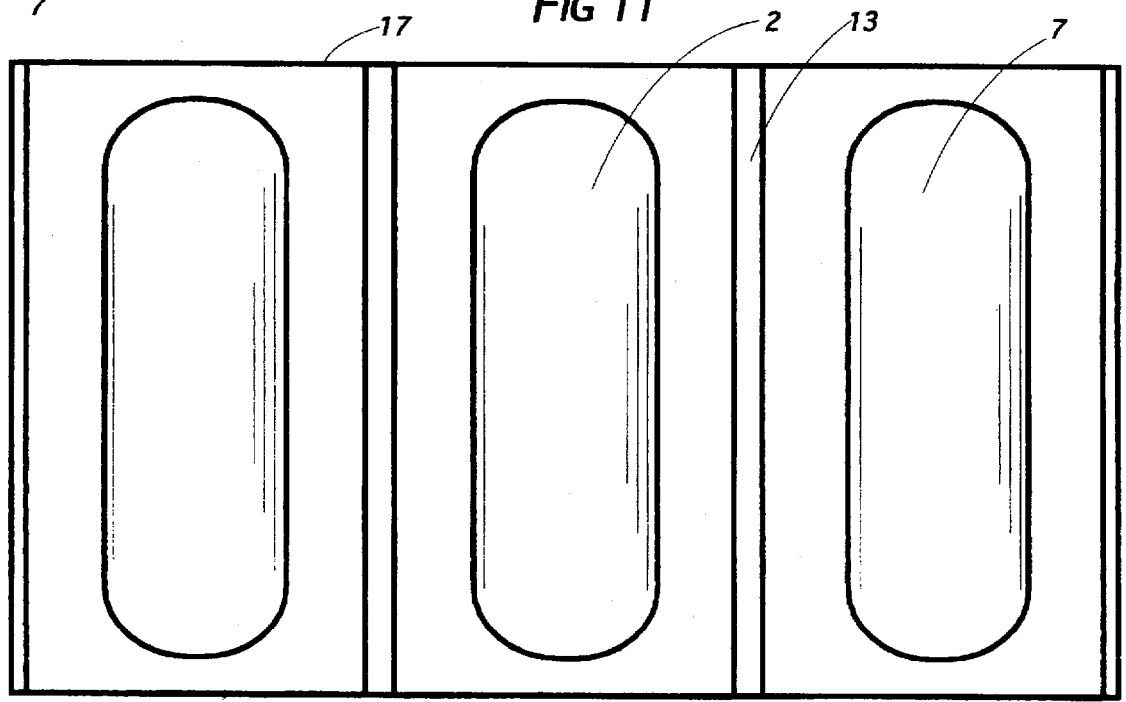
Figure 13:
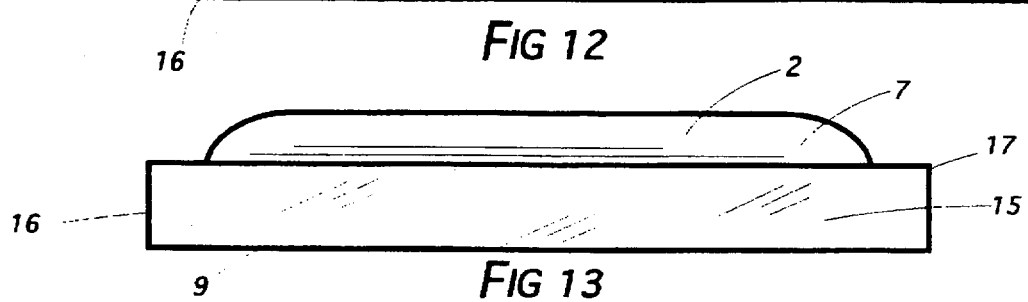
Figure 14:
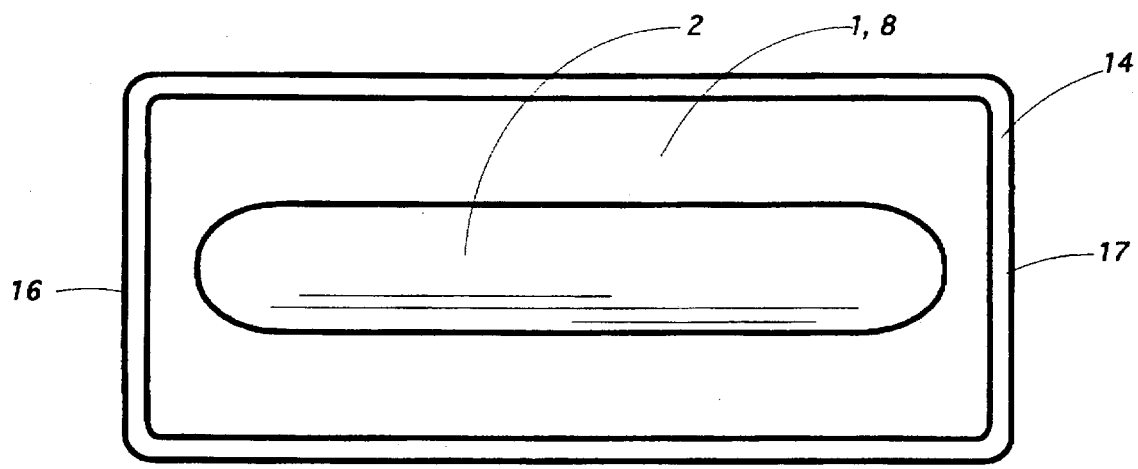
Figure 15:
Figure 16:
Figure 17:
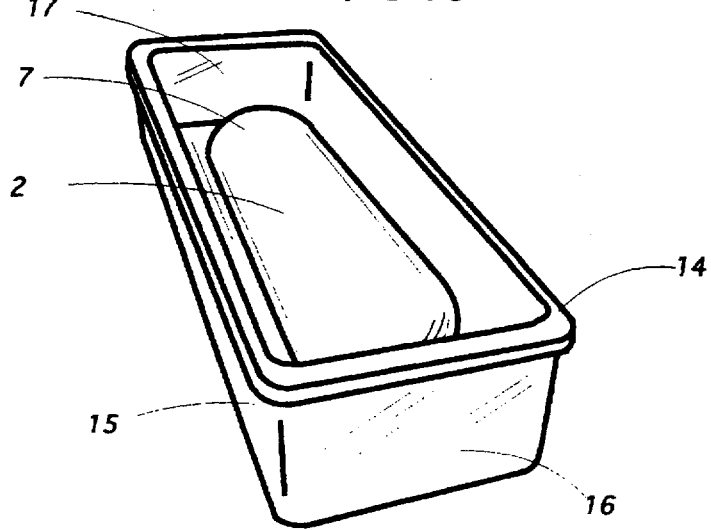

The assembly of a conventional hot dog or hamburger is often a messy undertaking. One must open the bun widely to allow space for the weiner, bratwurst or hamburger patty and accompanying condiments such as chopped onions, relish, mustard and ketchup. The bun's openness, however, allows the contents to leak or be inadvertently squeezed out, sometimes soiling the consumer's hands or clothing. While this experience is particularly common with children, it occurs often enough with all. The assembly of the sandwich, whatever may be its contents, and its consumption would be facilitated if the meat and accompanying condiments had a hollowed bed for their retention.

Various devices or means have been invented to mold a recess or hollow into a bun or other baked product. The following references were disclosed in the prior art: U.S. Pat. Nos. 3,747,508, Elam; 3,943,840, Bolte; 4,047,477, Berke; 4,190,229, Bradshaw;, and 4,311,716, Launay. The last of these, a process application, involves a piston configuration within a cavity having fixed members to form the mold, the piston giving way to moldable material brought into the cavity. That device is suggestive of the pans with a center core, particularly those having a removable bottom, used to make a tall cake with a hollow cylindrical center. The other four have in common a forming means, generally of rod-like configuration, held within dough during the baking process and afterwards extracted therefrom.

The foregoing devices in the prior art have in common the baking of material within a mold. The present invention allows dough to rise freely, however, the molding being accomplished only upon a part of the dough by reason of its weight upon the underlying surface (1). With the inventions cited, the surface of all or most of the dough or other material is not permitted to rise, brown and crisp exposed to the ambient heated oven air as would the top of a baking loaf of bread. It is common knowledge that there is consumer appeal in baked products with a low porosity, smooth, crisp and shining surface texture which those rising unrestricted and browning within an oven exhibit. Hot dog and hamburger buns baked in the traditional commercial bakery manner, without channeled or hollowed interiors, rise and brown in that appealable fashion and this invention preserves that characteristic.

The cost and, therefore, the limitation upon practical accessibility to individuals of the items cited from prior art exceeds considerably that of the present invention. That for the Launay device would depend upon the intended level of use—that is, whether employed commercially or made available by more simple manufacture for individual kitchen use. The other inventions cited, while suitable for large scale commercial bakery use, of necessity, require substantial capital investment. The present invention has no moving parts, and consists of no more than sufficiently rigid material, preferable heavy metal foil, to retain its corrugated configuration during the baking process. It is, therefore, affordably accessible to all individuals for cookouts or kitchen snack preparations as well as to retail bakeries operating below the large scale commercial manufacturing level.

The invention's low manufacturing cost, simplicity of construction and compactness make it feasible for food item producers to include it in the packages for retail items such as frozen dough or baking flour.

Preferred Embodiment

The present invention may be constructed of any heat resistant material, whether sheet (1) metal, glass, high temperature tolerant plastic, ceramic or other durable material. It may be coated with some low friction substance extant in other areas of the prior art than those of concern here to facilitate separation of the baked product from the baking mold. The inventor believes the most suitable utensil material to be aluminum foil or sheet (1) of sufficient thickness to retain its integrity during packing, shipping, baking use and storage. Any of the desired configurations could thereby be readily forge stamped out in aluminum for mass produced manufacture. Because of its lightness, an aluminum product might be enclosed in retail baking packages witout compromising shipping concerns over size or weight. Nevertheless, a more rigid material such as that commonly produced with tin, sheet alloyed metal or ceramics might feasibly be retailed along with other kitchen ware.

While the cavities or recesses molded into the dough need not be limited in size and might in some instances be large enough to accommodate buns for baloney, polish sausage and the like, the inventor believes the usual cavity measurements should be those either of a weiner, bratwurst link or a moderately sized hamburger patty.

Figure 18:
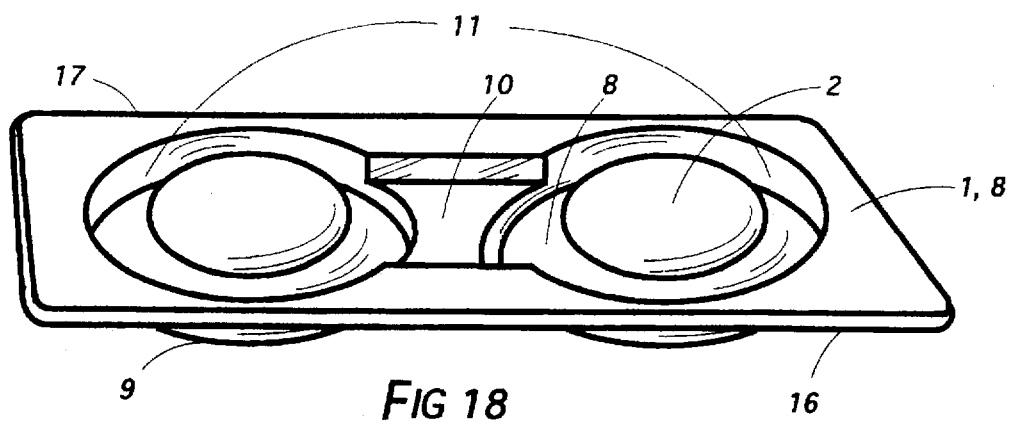
Figure 19:
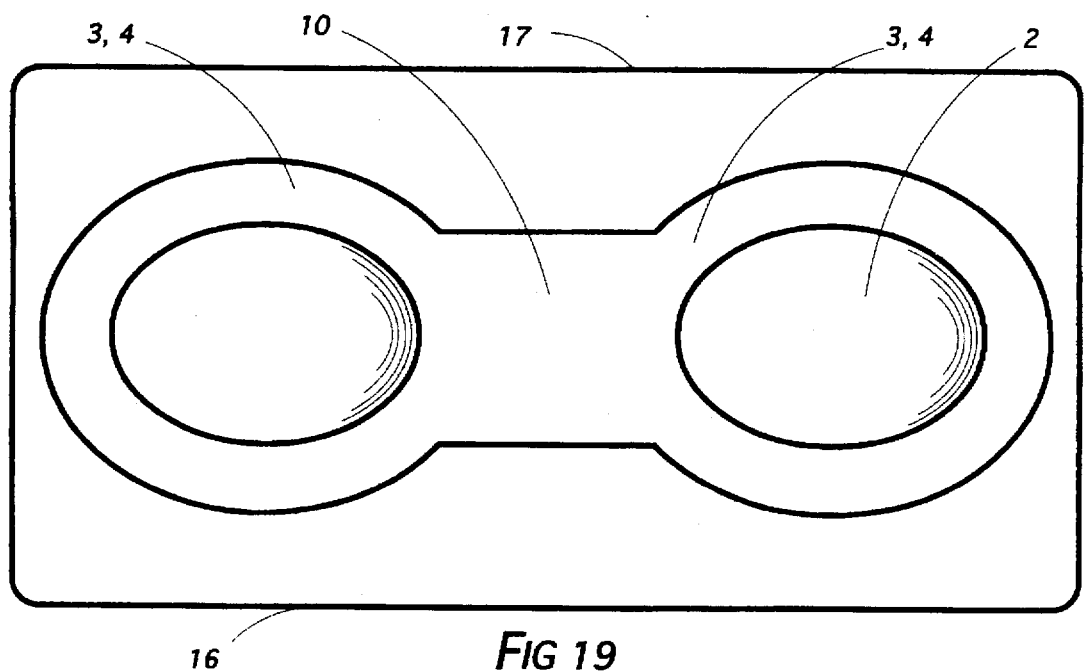
Figure 20:
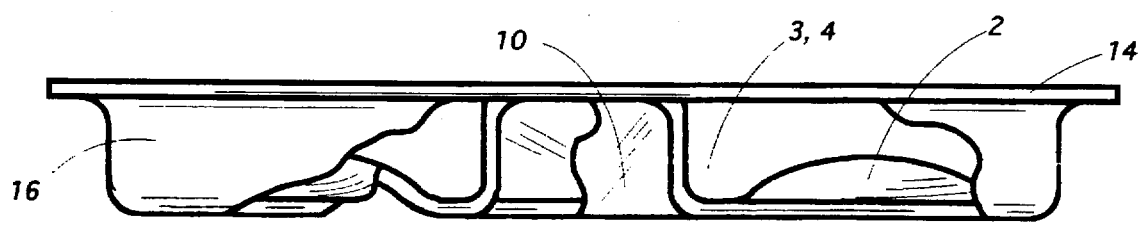
Figure 21:
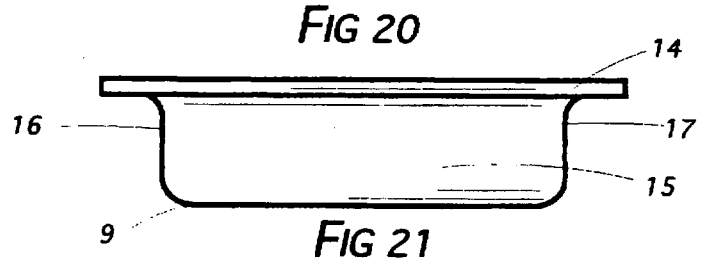

The hamburger patty bun pan involves oval shaped (3) wells (4) as receptacles for the dough (FIGS. 18–20). Nonetheless, any bun shape—whether oval shaped (3) (as would be produced by the utensil in FIGS. 18, 19), or one of some artful characteristic—is appropriate for one occasion or another. For that matter, a baking utensil bearing molds to form a variety of shaped hamburger buns would be useful in some instances. Then too, a bun need have no defined perimeter at all, as when baked in a utensil having its meat cavity forming mold (2) but devoid of a ridge (13) (14) (15), wall (5) or well (4) for the bread dough.

While baking would likely be accomplished in any conventional gas, electric or microwave oven or upon a range-top grill, it might be preferred at a cookout to bake on the same grill the meat is cooked.

For those instances in which no more than one sandwich is to be prepared, singular cell molding utensils would be useful (FIGS. 7–10 and 14–17).

Though not as econcomical as the open (6) ended variety, some of the utensils offered herein produce closed (7) ended buns. An obvious example is the utensil for the molding of hamburger buns (FIGS. 18–21). Closed (7) end configurations can be used advantageously for hot dogs as well, however (FIGS. 11–13 and 14–17). These utensils may also be mass produced using the same or similar techniques as for the open ended variety. One of the closed (7) end configurations depicted herein molds a bun for a single hot dog (FIGS. 14–17).

The claims describe the utensil's configuration as bearing semitubular shaped elevations (2) (1, 6), defining those terms therein. Upon baking, the elevated protrusion (2) within the utensil's surface molds a corresponding cavity, recession, pocket or hollow into the bun. The character the surface of a utensil such as a sheet (1) or pan is considered to have may be described in alternative terms, depending upon the perspective from which it is viewed or the focus taken upon examination. If it is the upper surface (Y) which is described as having elevated protrusions, the underside (a) may be considered to have corresponding channels or recesses. Although the latter are perhaps easier to describe and visualize abstractly, the discussion and claims herein are framed in terms of elevations (2) within the utensil's surface, since it is such a protrusion (2), not a recess, which directly molds the baking bread dough.

For hot dogs and like sandwiches, the baking utensil may be manufactured to bear semitubular elevations (2) as wide and deep as the diameter of the weiner or other contents (FIGS. 1–6 and 11–13). However, the utensil's elevations (2) can be limited in depth to a fraction of diameter size, thus requiring the mating of two fractionally shaped parts in the sandwich's assembly (FIGS. 7–10 and 14–17).

A hamburger bun baked in the utensil provided for it herein (FIGS. 18–21) would be hinged (10) in bivalve fashion. Univalvular buns, those produced from a mold for hot dog weiners or brats with recesses deepened to full diameter of a weiner or brat (FIGS. 1–6 and 11–13), also share the fully enfolding character of a bivalvular one, although any hinge (10) which is considered to be present is only a continuous part of the bun's exterior, not a distinct structure. One portion of a hamburger bun might be formed with a cavity equal to the total thickness of a hamburger patty. Hamburger buns so made are neither bivalvular nor univalvular. They consist of two unhinged parts. Buns baked in utensils bearing molds elevated (2) in height only to a fraction of the meat content's diameter or thickness provide only that fraction of the enclosing capacity of a univalvular one. Their hemispheric or partial bodied character requires that they be produced in pairs (11). The buns formed from two utensils each capable of producing a hot dog bun with cavities only half the diameter of a weiner (FIGS. 7–10 and 14–17) must be fitted together. The fraction need not be limited to one-half, however. Where one of the single bun utensils bakes a bun with a cavity of fractional depth other than one-half, that bun should be mated with another having a cavity of completmentary fractional depth—i.e., one-fourth and three-fourths; or three-eights and five-eights. The multi-bun forming utensils (FIGS. 1–6 and 11–13) bear ridges (12) (13) (14), some being oriented between (12) (13) the semitubular elevations (2) and others along (14) the sides (15), forming the edges (15), including proximal (16), distal (17) and side edges (15) of the utensil (3). When the elevations (2) of the utensil are equal in height to the full diameter of the intended tubular product contents, the bun products are univalvular and all of the ridges (12) (13) of the utensil form walls (12) (13) between them. The ridges (12) (13) may, therefore, be uniform in height (FIGS. 1–6 and 11–13). One of the utensils claimed provides for a plurality of complementary fraction paired (11) configurations and the buns made from them are, therefore, bivalvular. Utensils with a plurality of protruding elevations (2) designed for fractional height should bear an even number of them with every other interior ridge (12) between the elevational protrusions, or semitubular elevations (2) as they are described in the claims, being substantially shorter in height than the others (13) to form folding hinges in the bun. Elevations (2) of sufficient height to produce a bun which accommodates the entire diameter of its intended contents may be either odd or even in number in their molds. Where only one hot dog is being provided for, one may use two single half bun utensils and mate the buns from them, may produce a completely enfolding univalvular bun in a singular forming utensil or may produce a bivalvular bun using just a portion of a multiple bun forming utensil.

The inventor hereby claims:

1. A molding utensil for all or a portion of a hot dog or other sandwich bun, the utensil comprising a generally extended surface comprising an upper portion;

the surface being bounded by:

side edges, disposed parallel one another;

a proximal edge; and a distal edge;

the surface's upper portion comprising one of:

a singular semitubular elevation; and a plurality of semitubular elevations disposed therein parallel the side edges, each semitubular elevation comprising:

height between one-eighth inch and two inches;

ends coterminous with the proximal and distal edges of the utensil's surface;

the surface's upper portion further comprising:

side ridges defining the side edges of the surface, the side ridges comprising:

ends coterminous with the utensil surface's proximal and distal edges;

the surface's upper portion further comprising:

interior ridges disposed between each semitubular elevation plural in number, each ridge comprising:

an end coterminous with the utensil surface's proximal and distal edges;

when plural in number, one of:
uniformity in height; and
substantially shorter height for every other one of them, whereby a folding hinge is formed between two adjoining buns baked upon the utensil.

2. The molding utensil described in claim 1, the semitubular elevations comprising ends coterminous with the utensil surface's upper portion within the proximal and distal edges.

3. The molding utensil described in claim 1, the surface's upper portion further comprising:
proximal and distal ridges, defining the proximal and distal edges of the surface, each proximal and distal ridge comprising:
height exceeding that of the semitubular elevations; and
ridge ends coterminous with the side ridges.

4. The molding utensil described in claim 2, the surface's upper portion further comprising:
proximal and distal ridges defining the proximal and distal edges of the surface, each proximal and distal ridge comprising:
height exceeding that of the semitubular elevations; and
ridge ends coterminous with the side ridges.

5. A molding utensil for all or a portion of a hamburger or other sandwich bun comprising a generally extended surface comprising:
an upper portion;
an underside;
the surface being bounded by:
side edges;
a proximal edge; and
a distal edge;
and further comprising one of
metallic composition; and
nonmetallic composition;
the surface's upper portion comprising:
one or more sets of paired wells therein, each comprising:
a wall comprising:
height of between one-eighth inch and two inches; and
an elevated protrusion therein comprising:
length and breadth, each of between two and one-half and four and one-half inches, defining a perimeter of oval shape;
height less than that of the well wall;
the surface's upper portion further comprising:
a hinge forming well interconnecting each member of a well pair comprising:
length of between three and three and one-half times the height of the elevated area;
breadth less than the diameter of each well;
height between one-quarter and three-quarters that of the well wall.

6. A molding utensil for all or a portion of a hot dog or other sandwich bun, the utensil comprising a generally extended surface comprising an upper portion;
the surface being bounded by:
side edges:
a proximal edge; and
a distal edge;
the surface's upper portion comprising one of:
a singular semitubular elevation; and
a plurality of semitubular elevations;
disposed therein parallel one another when plural in number, each semitubular elevation comprising:
height between one-eighth inch and two inches;
ends coterminous with one of:
the proximal and distal edges of the utensil's surface;
the utensil surface's upper portion within the proximal and distal edges;
the surface's upper portion further comprising:
side ridges defining the side edges of the surface, the side ridges comprising:
ends coterminous with the utensil surface's proximal and distal edges;
the surface's upper portion further comprising:
side ridges defining the side edges of the surface, the side ridges comprising:
ends coterminous with the utensil surface's proximal and distal edges;
the surface's upper portion further comprising:
interior ridges disposed between each semitubular elevation plural in number, each ridge comprising:
an end coterminous with the utensil surface's proximal and distal edges;
when plural in number, one of:
uniformity in height;
substantially shorter height for every other one of them, whereby a folding hinge is formed between two adjoining buns baked upon the utensil.

* * * * *